US010490077B2

(12) United States Patent
Altinger et al.

(10) Patent No.: US 10,490,077 B2
(45) Date of Patent: Nov. 26, 2019

(54) METHOD FOR TRAFFIC CONTROL IN A PARKING ENVIRONMENT

(71) Applicant: AUDI AG, Ingolstadt (DE)

(72) Inventors: Harald Altinger, Gerolfing (DE); Florian Schuller, Ismaning (DE)

(73) Assignee: Audi AG, Ingolstadt (DE)

(*) Notice: Subject to any disclaimer, the term of this patent is extended or adjusted under 35 U.S.C. 154(b) by 59 days.

(21) Appl. No.: 15/580,854

(22) PCT Filed: Apr. 28, 2016

(86) PCT No.: PCT/EP2016/000687
§ 371 (c)(1),
(2) Date: Dec. 8, 2017

(87) PCT Pub. No.: WO2016/198139
PCT Pub. Date: Dec. 15, 2016

(65) Prior Publication Data
US 2018/0350238 A1  Dec. 6, 2018

(30) Foreign Application Priority Data

Jun. 11, 2015  (DE) .................. 10 2015 007 531

(51) Int. Cl.
*G08G 1/14* (2006.01)
*G08G 1/005* (2006.01)
(Continued)

(52) U.S. Cl.
CPC .......... *G08G 1/149* (2013.01); *B62D 15/027* (2013.01); *G01C 21/3415* (2013.01);
(Continued)

(58) Field of Classification Search
CPC .............. B62D 15/027; B62D 15/028; G01C 21/3415; G01C 21/3685; G05D 1/0212;
(Continued)

(56) References Cited

U.S. PATENT DOCUMENTS 8,457,844 B2  6/2013  Widmann
8,521,352 B1  8/2013  Ferguson et al.
(Continued)

FOREIGN PATENT DOCUMENTS

DE  102008019346 A1  9/2009
DE  102009029720 A1  12/2010
(Continued)

OTHER PUBLICATIONS

International Search Report and Written Opinion of the International Searching Authority directed to related International Patent Application No. PCT/EP2016/000687, dated Sep. 9, 2016, with attached English-language translation; 24 pages.
(Continued)

*Primary Examiner* — Maceeh Anwari
(74) *Attorney, Agent, or Firm* — Sterne, Kessler, Goldstein & Fox P.L.L.C.

(57) ABSTRACT

A method is provided for controlling traffic in a parking environment comprising at least one parking space and used by at least a first group of manually operated traffic participants and a second group of automatically operated traffic participants. A central control device by considering current status information of traffic participants as determined by sensors and/or transmitted by the traffic participants, determines instruction information for each traffic participant. The instruction information describes the future operation of each traffic participant in a common route planning for all traffic participants using the parking environment. The central control device transmits the instruction information, via a communication link, to at least one part of the traffic participants. The instruction information is used for outputting information and/or automatically controlling each traffic participant.

20 Claims, 2 Drawing Sheets

(51) Int. Cl.
*B62D 15/02* (2006.01)
*G01C 21/34* (2006.01)
*G01C 21/36* (2006.01)
*G05D 1/02* (2006.01)
*G08G 1/095* (2006.01)
*H04L 29/08* (2006.01)

(52) U.S. Cl.
CPC ....... *G01C 21/3685* (2013.01); *G05D 1/0212* (2013.01); *G08G 1/005* (2013.01); *G08G 1/095* (2013.01); *G08G 1/14* (2013.01); *G05D 2201/0213* (2013.01); *H04L 67/12* (2013.01)

(58) Field of Classification Search
CPC .... G05D 1/0246; G05D 1/0297; G08G 1/005; G08G 1/015; G08G 1/095; G08G 1/096811; G08G 1/096844; G08G 1/14; G08G 1/142; G08G 1/143; G08G 1/146
USPC .......................................................... 701/26
See application file for complete search history.

(56) References Cited

U.S. PATENT DOCUMENTS

| | | | |
|---|---|---|---|
| 9,442,489 | B2 | 9/2016 | Reichel et al. |
| 2012/0078504 | A1* | 3/2012 | Zhou ................. G01C 21/3611 701/411 |
| 2017/0212511 | A1* | 7/2017 | Paiva Ferreira ....... G08G 1/143 |

FOREIGN PATENT DOCUMENTS

| | | |
|---|---|---|
| DE | 102009029117 A1 | 3/2011 |
| DE | 102010033215 A1 | 2/2012 |
| DE | 102011119208 A1 | 5/2013 |
| DE | 102011088809 A1 | 6/2013 |
| DE | 102012021282 A1 | 4/2014 |
| DE | 102012222562 A1 | 6/2014 |
| DE | 102013011824 A1 | 1/2015 |
| EP | 2374661 A1 | 10/2011 |

OTHER PUBLICATIONS

An, et al., "Cooperative Vehicle Control System Based on Fusion Map," 7th International Conference on Computing and Convergence Technology, Dec. 3, 2012; pp. 94-97.
Lavalle, et al., "Optimal Motion Planning for Multiple Robots Having Independent Goals," IEEE Transactions on Robotics and Automation, vol. 14, No. 6, 1998; pp. 912-925.
Stentz, A., "Optimal and efficient path planning for partially-known 5 environments," Proceedings of the IEEE International Conference on Robotics and Automation, May 8-13, 1994; pp. 3310-3317.
English-language Abstract of German Patent Application Publication No. 102008019346 A1, published Sep. 24, 2009; 1 page.
English-language Abstract of German Patent Application Publication No. 102009029720 A1, published Dec. 30, 2010; 1 page.
English-language Abstract of German Patent Application Publication No. 102009029117 A1, published Mar. 3, 2011; 1 page.
English-language Abstract of German Patent Application Publication No. 102010033215 A1, published Feb. 9, 2012; 1 page.
English-language Abstract of German Patent Application Publication No. 102011119208 A1, published May 23, 2013; 1 page.
English-language Abstract of German Patent Application Publication No. 102011088809 A1, published Jun. 20, 2013; 2 pages.
English-language Abstract of German Patent Application Publication No. 102012222562 A1, published Jun. 12, 2014; 1 page.
English-language Abstract of German Patent Application Publication No. 102013011824 A1, published Jan. 15, 2015; 1 page.
International Preliminary Report on Patentability directed to related International Patent Application No. PCT/EP2016/000687, dated Dec. 21, 2017, with attached English-language translation; 16 pages.

* cited by examiner

METHOD FOR TRAFFIC CONTROL IN A PARKING ENVIRONMENT

TECHNICAL FIELD

The present invention refers to a method for controlling traffic in a parking environment comprising at least one parking space and used by at least a first group of manually operated, and a second group of automatically operated traffic participants, wherein a central control device is used.

BACKGROUND

The possible communication with traffic participants, in particular motor vehicle, as well as its increasing configuration for the at least partially automatic operation have led to a plurality of developments for improving the traffic flow control in parking environments. For example, automatic parking garages have been proposed, in which motor vehicles are positioned in a sort of automatic warehouse, wherein motor vehicles, after having been parked in a transfer area, are automatically transferred to the corresponding parking space within the parking garage, in which a central control device of the parking garage correspondingly regulates the traffic of automatized motor vehicles. In order to recover the motor vehicle, the same is also automatically transferred into the transfer area.

For parking environments, in which the traffic participant, in particular motor vehicles, are manually operated, central control devices have also been already proposed, which assign parking spaces to new motor vehicles to be parked, and which transmit instruction information, which may be used by a navigation system on the motor vehicle, to the motor vehicle, by means of a communication link. The instruction information may be used within the motor vehicle for directing the driver to the corresponding parking place.

Finally, it is also already known to influence the parking reassignment and the driving paths in parking environments by means of static and/or controllable traffic influencing devices or traffic influencing systems. Static traffic influencing devices may comprise signs, for example, whereas controllable traffic influencing devices may comprise traffic light systems and/or light barriers. The control may be manually performed, by means of timing circuits and/or depending on measurements by installed sensors, such as parking sensors and/or light barriers.

In this case a drawback is consisted whenever a parking environment has to be used heterogeneously, in particular by manually operated traffic participants (e.g., a first group of traffic participants) and automatically operated (piloted) traffic participants (e.g., a second group of traffic participants). The use of piloted traffic participants is not considered in current concepts of traffic flow/parking control and may cause, due to lack of communication between manually operated and automatically operated traffic participants, to traffic jams, for example, such as a slowing down or blocking of travel paths. An essential aspect of this problem is that the efficacy of measures for controlling the traffic flow/parking assignment is always dependent on the compliance and interpretation by the drivers of the manually operated motor vehicles. Another drawback is that in such heterogeneously used parking environments for piloted traffic participants, in particular motor vehicles, during rush hours, excessive waiting times and similar may be experienced.

BRIEF DESCRIPTION OF THE DRAWINGS/FIGURES

DETAILED DESCRIPTION

Figure 1:
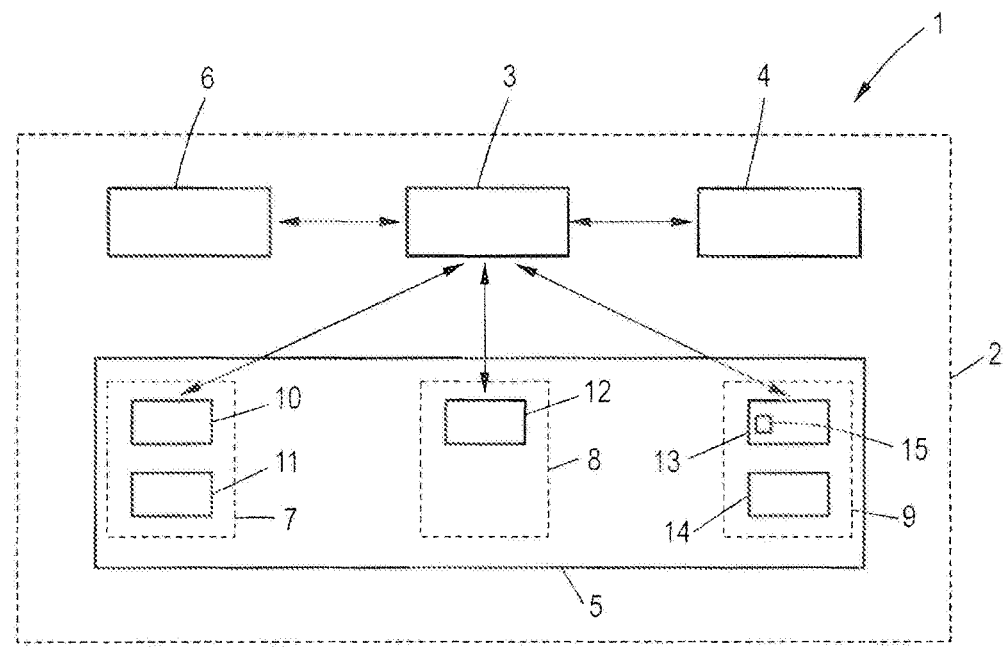
FIG. 1 illustrates a schematic representation of a system for executing the method of the invention.

The object of the invention is thus to provide a traffic control method, which improves the traffic flow in heterogeneously used parking environments.

In order to solve this problem, in a method according to the invention, by taking into account the current status information of traffic participants, as determined by sensors and/or transmitted by traffic participants for each traffic participant, instruction information describing the future operation of the traffic participant in a common route planning for all traffic participants using the parking environment is determined and transmitted via a communication link to at least one part of the traffic participants, wherein same is used for outputting information and/or automatically controlling the traffic participant.

In particular, the invention is based on concepts of traffic flow control in parking environments, providing a central system for the coordination of all traffic participants in case of heterogeneous use. As generally known, sensor data of sensors provided on the infrastructure and/or vehicle side, in particular cameras, parking sensors and/or light barriers, are used together with operating data of traffic participants, in particular of the motor vehicles, which are particularly transmitted by the same and may contain, among other things, the current position and/or a planned trajectory (planned path), in order to obtain a current representation of current traffic in the parking environment, in the form of status information. The basis of the traffic control in the inventive method preferably is a central map of the parking environment, which is stored in the central control device, and which allows a spatial and temporal synchronization the situation awareness between infrastructure-side and traffic participant-side sensors. In particular, it may be conceived that regions are spatially and temporally reserved for the operation of individual traffic participants, so that also a temporally and spatially defined sector-wise occupation and release may occur within the parking environment.

The basic idea is now that in the route planning, which is centrally executed in the control device, a comprehensive approach is followed, which takes into account all traffic participants within the parking environment, in particular the different operating properties of individual groups, in order to direct manual traffic participants, navigation supported traffic participants and automatically operated traffic participants through the parking environment in a temporally and route-optimized way, also ensuring the efficient use of parking surfaces and traffic routes. Thus, in particular in route planning for piloted traffic participants, special properties and predicted trajectories of manually operated traffic participants are precisely taken into account as well as the contrary. It is particularly advantageous, as detailed in the following, if even for motor vehicles, which are neither navigation based nor automatically operated, a certain degree of compliance with the instruction information may be ensured, so that a particular advantageous embodiment of the invention provides the integral control of traffic influencing devices, in particular traffic lights, light barriers, display devices and similar, in order to more efficiently direct the traffic participants, which do not rely on communication for receiving the instruction information.

The present invention thus facilitates an efficient planning of traffic flows in parking environments, the reduction of traffic jams at the parking environment entrances and exits, in particular during rush hours, the precise influencing/controlling of the load on parking spaces and in a particularly convenient way also a reduction of waiting times until allocation/delivery of automatically operated traffic participants.

At this point it is to be noted that the traffic participants of the first and second group preferably are motor vehicles, and/or the parking environment is a parking garage. Algorithms for optimized and efficient route planning within parking environments or navigation environments in general are already known in the state of the art and thus do not require a detailed description, wherein, purely for illustrative purposes, reference is made to article by Steven M. LaValle and Seth A. Hutchinson "Optimal Motion Planning for Multiple Robots Having Independent Goals," IEEE Transactions on Robotics and Automation, Vol. 14, No. 6, 1998, page 912 to 925, and Anthony Stentz, "Optimal and efficient path planning for partially-known environments," Proceedings IEEE International Conference on Robotics and Automation, 1994.

A particularly advantageous embodiment of the present invention consists in that in case of a deviation of a traffic participant of one group from a received instruction information, the current instruction information for at least another traffic participant of the other group is adjusted, in particular depending on a deviation information describing the deviation. In this way, a sort of feedback is provided within the traffic, so that, for example, deviations caused by driver errors of manually operated traffic participants may be contrasted by the original route planning in a correspondingly rapid way. Concretely, it may be foreseen that in case of deviations by a manually or automatically operated traffic participant, a trajectory to be traveled and/or a target to be approached for at least one automatically or manually operated traffic participant may be adjusted. For example, when a manually operated traffic participant performs a wrong turn, not only its parking place and trajectory to be traveled are updated, but also a simple and reliable adjustment for automatically operated traffic participants may occur, which, for example, were planned in a temporal and spatial region, which is now occupied by the manually operated traffic participant. However, it may also be envisaged that in case of communication breakdown to an automatically operated traffic participant, manually operated traffic participants are deviated and similar. Therefore, in case of deviations, adjusted parking place assignments, adjusted trajectories and similar may be sent to a traffic participant of the respective other group, in order to compensate the deviations in the best possible way. It is now to be noted that trajectories may be conceived herein as comprising temporal and spatial components, thus also comprising waiting times, for example.

Furthermore, it is also convenient if for at least one automatically operated traffic participant a current spatial operating region of a manually operated traffic participant is blocked, in particular in case of deviation of the manually operated traffic participant from the instruction information or in case of impossibility to transmit the instruction information to a manually operated traffic participant. This is based on the idea that the reliability with which the manually operated traffic participant follows the instruction information is overall reduced, after the driver eventually determines how the traffic participant is moving, so that manually operated traffic participants may be provided with a larger maneuvering freedom, in order to avoid, if necessary, required new route planning for automatically operated traffic participant. Obviously, it is also possible that for at least one manually operated traffic participant a current spatial operating region of an automatically operated traffic participant is blocked, so that the manually operated traffic participant cannot be impeded by the automatically operated traffic participant.

When comprehensively examining the heterogeneous population of traffic participants in the parking environment, other synergies may also be used. For example, in case a manually operated traffic participant following, according to current instruction information, an automatically operated traffic participant for at least one trajectory segment, the relative instruction information is determined as comprising a subsequent request recommending a subsequent operation. If it is thus determined that a portion of the route for an automatically operated and a manually operated traffic participant is the same, the navigation assistance may be simplified in that the driver of the manually operated traffic participant is provided with a request for a subsequent operation regarding the automatically operated traffic participant, thus a subsequent request.

In the context of the present invention it is particularly convenient to ensure, with the highest possible reliability, even for manually operated traffic participants, that they follow these instruction information, since in this way an effective traffic flow control within the parking environment become possible, which is rarely required to be adjusted. In particular, at least in the case of manually operated traffic participants, which receive the instruction information, it is possible to use systems of traffic participants, in particular of vehicles, provided within the traffic participants, in order to influence the further travel of the traffic participant, going beyond the simple provision of navigation instructions (navigation assistance). For example, in this context it may be envisaged that for at least one manually operated traffic participant a steering system for outputting a steering torque to a steering wheel is adapted for outputting a hint torque opposed to a steering process opposed to an instruction information. If the driver therefore wants to turn right, for example, although the instruction information foresees a left turn, a countering steering torque may be provided on the steering handle, in particular a steering wheel, which clearly informs the driver that she is acting against the instruction information. The ideal path to be followed is thus more clearly indicated to drivers of manually operated traffic participants.

In one exemplary embodiment of the present invention, for directing at least one manually operated traffic participant, in particular a traffic participant not adapted for receiving instruction information, at least one traffic influencing device of the parking environment is controlled depending on the instruction information associated to this traffic participant. In order to ensure, in a more reliable way, that also manually operated traffic participants in particular those not capable of receiving instruction information, follow the instruction information, traffic influencing systems are used by the central control device, in order to direct the traffic participants in the correct direction. The traffic influencing system may be at least one traffic light and/or at least one light barrier and/or at least one information displaying device, such as a display or similar. In this way, for the first time it becomes possible to use traffic influencing devices in a parking environment, which is heterogeneously used, in such a way that the manually controlled traffic optimally merges with the automatically controlled traffic and also regarding the manually operated traffic participants a higher reliability in following the instruction information is obtained. If for instance a driver is not allowed to park on the current parking level, traffic lights and/or barriers may be closed at corresponding parking spaces. A display device situated outside of the traffic participant may be used in order to output navigation instructions also to traffic participants, which are not provided with the possibility to receive instruction information.

All in all, in this way, through a continuous detection, evaluation and adaptation of the traffic flows at each point in time an optimal information is provided, in order to direct the traffic participants along time and travel-optimized paths through the parking environment while ensuring the efficient use of parking spaces and traffic routes.

This process may be expanded, with particular advantage, also to other traffic participants, in particular to pedestrians. For example, pedestrians may be considered as a third group of traffic participants, for which instruction information are determined. Exactly when also manually operated traffic participants are admitted into a parking environment, it is probable that pedestrians moving to or from a parked traffic participant, are present in the parking environment as a third group of traffic participants, who may be taken into account in particular also in the comprehensive evaluation and central control of traffic flows provided by the inventive method. In order to implement instruction information for pedestrians, various possibilities are provided.

For example, at least one traffic light and/or at least one barrier and/or at least one information displaying device and/or at least one locking device for a door may be controlled, as a traffic influencing device for directing a pedestrian, according to the corresponding instruction information. Thus, in the case of pedestrians as with manually operated traffic participants, which do not have the capacity to receive instruction information, it may be foreseen that traffic influencing devices of the parking environment may be controlled depending on the instruction information associated to the pedestrian, wherein to this end additionally locking devices for doors may also be considered. If for example a parking level is very busy, in particular by traffic participants of the second group, pedestrians should temporarily not be allowed to enter this area, so that a corresponding door leading to this spatial area may be kept closed. Also, specific traffic lights, barriers and display devices for pedestrians may be obviously used, in order to provide the pedestrians with the instruction information and to ensure the coordinated optimized global operation, as determined in the route planning.

It is however also possible, in an advantageous way, to provide the navigation assistance also to pedestrians, in that for example, if a pedestrian carries a mobile device provided for a communication link with the central control device, the instruction information are transmitted to the mobile device and used therein for outputting information. Applications for mobile devices, such as smartphones, have already been proposed, for example under the keyword "carfinder", which may direct the pedestrian within a parking environment to their respective vehicle. These applications may also be used in the context of the present invention in order to process instruction information received from the central control device and to ensure the reliable following of instructions by the pedestrian. It may, for example, be possible that the pedestrian waits for the passing of a traffic participant of the first or second group and similar.

Also in the case of pedestrians it may be considered that in case of a deviation of a traffic participant of a group from an obtained instruction information, the current instruction information for at least one pedestrian may be adjusted, in particular in addition to an instruction for at least one traffic participant of the other group. A pedestrian may for example be required to wait, when surprisingly a manually operated traffic participant makes a wrong turn and thus penetrates in the area of a predicted trajectory of the pedestrian; it is obviously also possible to deviate the pedestrian to a safe path. On the other hand, it is also particularly advantageous if a spatial area, in particular depending on a predicted trajectory of a pedestrian, where the presence of the pedestrian is detected, is blocked to traffic participants of the first and second group. Thus, if in the route planning it is foreseen that a pedestrian may cross a certain pedestrian crossing within a given time interval, this spatial region may be blocked, within the corresponding time interval (or a time interval derived from the same), with regard to the manually operated traffic participants and the automatically operated traffic participants, in particular motor vehicles. In this way, the safety of the pedestrians is greatly enhanced.

The classification performed for traffic participants in groups, such as the one herein described, may also be conveniently expressed as a prioritization of traffic participants. Groups of traffic participants, in particular also of a third group, may be associated with priority values, wherein the temporal optimization and/or the optimization referred to the travel path (or route) in the parking environment, performed during the determination of the instruction information, for traffic participants of one group with a higher priority value, may for example be weighted with a stronger weight with respect to traffic participants of a group having a lower priority value. Concretely, for example, the priority value for the second group may be higher than the one of the first group and/or of the third group and/or, if a third group is provided, the selected priority value of the third group may be lower than the first and second group. It may be thus ensured, for example, that automatically operated traffic participants are rapidly transferred to their parking place or in the transfer area, since the person associated with the traffic participant has to wait for this time interval. Moreover, it is also advantageous if the traffic flow of motorized traffic participants has in general a higher priority, since pedestrians may accept waiting times more lightheartedly than drivers of motorized traffic participants.

In route planning, thus the determination of instruction information, data relative to drivers' desires may obviously be taken into account, in particular with reference to the driving endpoint. It is however also advantageous if the determination of the instruction information occurs according to at least one additional information referred to time, which describes an expected traffic. Thus, in addition to sensor data or operation data of motor vehicles, metadata regarding traffic may also be considered, in order to improve the optimization in the route planning. In particular in this context it is advantageous if the additional information is a statistically determined load information regarding the parking environment, in particular the parking areas and/or the entrance and exit routes. For example, by evaluation of corresponding input data, which may originate from the same traffic control described herein, time dependent basic patterns of occupation of park areas as well as entrance and exit routes may be determined in time, and these may be stored in the central control device and used during the optimization step. Suitable entrance and exit routes in the parking environment may for example be precisely used.

In the invention, a system may thus be provided, which comprises the parking environment with the central control device as well as the traffic participants operating within the same, and which is generally adapted for performing the inventive method.

Figure 2:
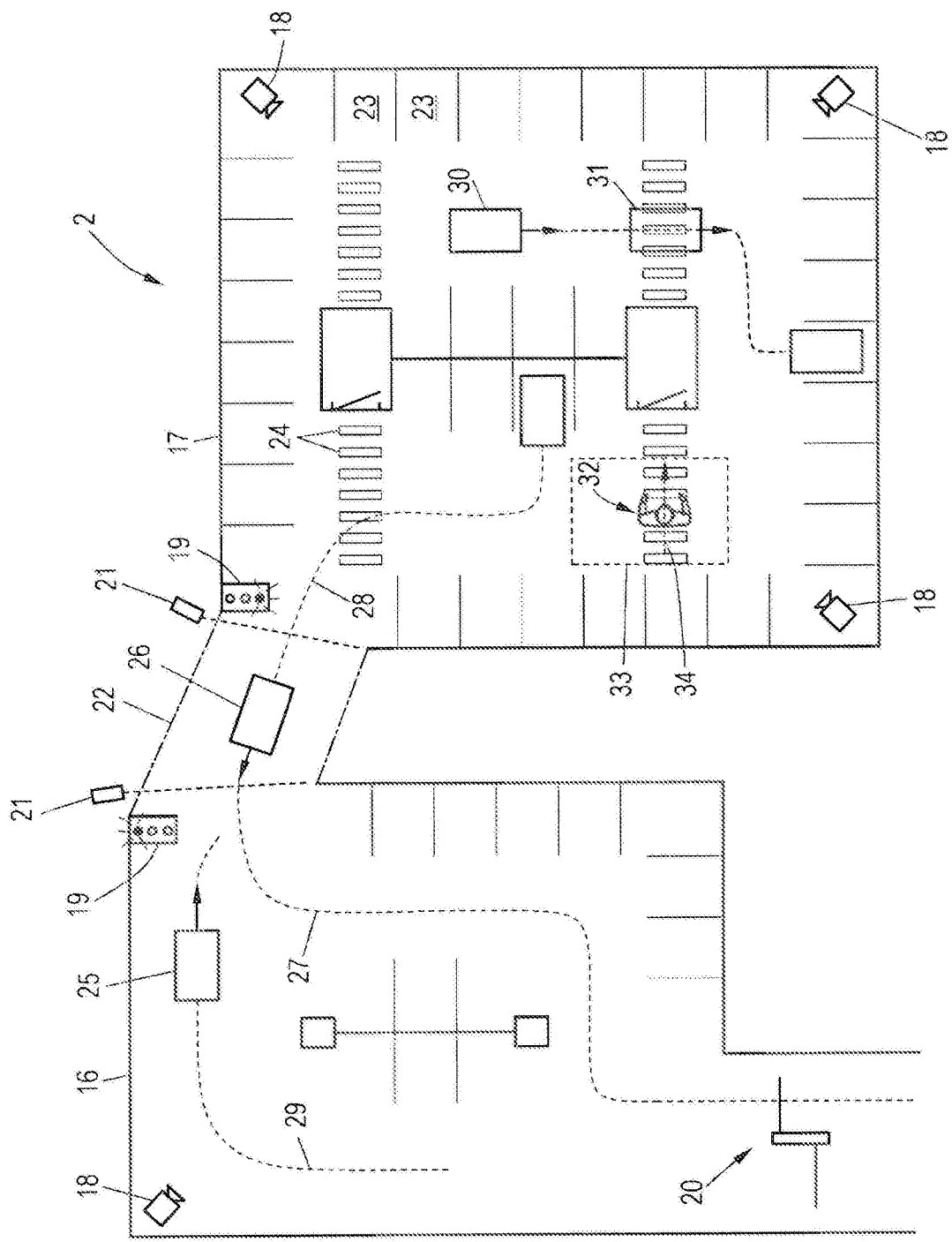
FIG. 2 illustrates a schematic representation of details of a parking environment with different traffic situations to explain the method of the invention.

Further advantages and details of the present invention are provided in the following exemplary embodiments as well as by means of the drawings. In particular:

FIG. 1 schematically shows a system for executing the method of the invention, and FIG. 2 shows details of a parking environment with different traffic situations, in order to explain the method of the invention.

FIG. 1 shows a general system 1, in which the inventive method may be performed. A parking environment 2 is associated to a central control device 3, which may receive sensor data of a sensor system 4 of the parking environment 2 as well as operating data of corresponding traffic participants 5 adapted for communication, which operate within the parking environment 2. In particular, various communication types may be used, wherein the communication between traffic participants 5 and the central control device 3 is provided by Wi-Fi communication links or mobile radio links. Other communication standards may obviously also be implemented. The central control device 3 is also adapted for controlling traffic influencing devices 6, comprising barriers, traffic lights, display devices and locking devices for doors.

A particular characteristic of parking environment 2 is that it may be used by different groups 7, 8, 9 of traffic participants. The first group 7 of traffic participants 5 comprises manually operated traffic participants 10, 11, which may in turn be subdivided into manually operated traffic participants 10, which communicate with the central control device 3, and manually operated traffic participants 11, which do not communicate with the central control device 3. The second group 8 contains automatically operated (piloted) traffic participants 12, in this case also motor vehicles, which may be transferred by means of corresponding vehicle systems, in a fully automatic way, to a parking space within the parking environment 2 or in a transfer area, which is a pickup area. Since, within the parking environment 2, the manually operated traffic participants 10, 11 may be parked or operated, a third group 9 of traffic participants 5 may also comprise pedestrians 13, 14, wherein in turn these are divided in pedestrians 13, who use a mobile device 15 with an application for navigating within the parking environment 2 and pedestrians 14, who don't use such a mobile device 15.

Through the infrastructure-side sensors 4 (cameras, occupation sensors, light barriers, etc.) all traffic participants 5 within the parking environment are detected and tracked; further traffic connected status information may be obtained by communication of traffic participants 5 with the central control device 3, as operating data, which may in particular comprise information regarding the position, the current movement and the planned trajectory. A high definition digital map of the parking environment 2 is stored in a storage device of the central control device 3 and may be used in order to spatially order the position and motion information in the parking environment 2. The central control device 3 may also perform a prediction of the future movement of the traffic participants 5.

Based on the status information provided in the central control device 3, an optimized motion planning for all traffic participants 5 may be performed in any given moment, wherein the central map is not only used as a basis for the route calculations, but is also used for spatial and temporal synchronization of the situation awareness between infrastructure-side and traffic participant-side systems. It is important, in this case, that in route planning the information of all other traffic participants 5 may be taken into account, in order to determine instruction information for all traffic participants 5, wherein the route planning also considers the inclusion of the traffic participants 5 in different groups 7, 8 and 9, for example, in that manually operated traffic participants 10, 11 are granted a larger maneuvering space with respect to others. In particular, groups 7, 8 and 9 are assigned priority values, which determine, in the optimizing step, the weight, with which for the corresponding group 7, 8, 9 the travel path and duration of motion through the parking environment 2 are optimized. Currently, the time and route optimization for the traffic participants 12 of the second group 8 is considered to be the most important; then come the time and route optimizations of traffic participants 10, 11 of first group 7 and of pedestrians 13, 14 of third group 9, who have the lowest priority since based on the slower general motion, delays and small detours may be better coped with.

Instruction information describe the role of individual traffic participants 5 in the optimized coordinated traffic flow control. For the best possible implementation of the route planning the various types of traffic participants are now influenced by suitable control elements. The piloted traffic participants 12 of second group 8 are for instance provided with nominal trajectories in the instruction information, which are converted in corresponding driving interventions. For traffic participants 10 of first group 7 and pedestrians 13 a navigation assistance is performed, in which information regarding the nominal target trajectory are output, which may be manually implemented by the driver or by the pedestrian 13. However, also the reliability of instruction information for traffic participants 5 not connected to the central control device 3, in this case the traffic participants 11 and the pedestrians 14, may be increased in that the traffic influencing devices 6 are correspondingly used, in order to also direct the traffic participants 11 and pedestrians 14 according to instruction information. In the present case, also the navigation assistance is thus further improved (traffic participant 10 and pedestrian 13).

If, based on the status information, it is determined that a traffic participant 5 deviates from the instruction information, adjustments may be introduced, in particular also for traffic participants 5 of other groups 7, 8, 9. If for example a manually operated traffic participant 10, 11 of the first group 7 makes a wrong turn, an automatically operated traffic participant 12 of the second group 8 may correspondingly deviate according to an updated target trajectory.

It is also advantageous to block certain spatial areas for time intervals, in general, for route planning or for members of certain groups 7, 8, 9, for example in order to avoid forming an obstacle for manually operated traffic participants 10, 11 due to automatically operated traffic participants 12, and/or to ensure the safety of pedestrians 13, 14.

By continually detecting, evaluating and influencing the traffic flows, the optimal instruction information may be provided at any time, in order to direct the traffic participants 5 in a time- and path-optimized way through the parking environment 2. The efficient use of parking spaces and traffic routes is thus ensured.

It is to be noted that drivers' desires as well as additional information may be obviously being taken into account during the route planning. Additional data may regard the time-dependent, statistical load on the parking environment or the traffic condition, in order to further improve the optimization.

FIG. 2 shows a schematic simplified view of the parking environment 2, wherein in this case two levels 16, 17 of a parking garage are shown. The infrastructure devices shown are only illustrative and may obviously be provided in greater numbers, which refer in particular to exemplary cameras 18, traffic lights 19, barriers 20 and light barriers 21. The levels 16, 17 are connected by a ramp 22. Parking spaces 23 are shown by corresponding marks; thicker marks 24 indicate pedestrian crossings, for example.

In the following, various traffic situations are described. A manually operated motor vehicle 25 presently waits at a traffic light 19, which is a traffic influencing device 6. This is due to the fact that currently the automatically operated motor vehicle 26 is using the ramp 22. The automatically operated motor vehicle 26 has a higher priority. Its instruction information contains the planned target trajectory 27, wherein also the already traveled path 28 is illustratively shown.

As shown by the path 29 previously travelled by the motor vehicle 25, it has not used the main traffic route, but an alternative route, for example, in order to bypass a further maneuvering traffic participant 5 or in order to free the main traffic route for automatically operated traffic participants 12 of second group 8, which, as described, have a higher priority assigned to them.

A further manually operated, navigation assisted motor vehicle 30 and an automatically operated motor vehicle 31 moving in front of the former are also shown. Since a trajectory segment for motor vehicles 30, 31 contained in the instruction information is identical, the motor vehicle 30 was subsequently instructed, in order to simplify the navigation assistance, as part of the instruction information, to follow the motor vehicle 31 along the trajectory segment.

FIG. 2 also shows a pedestrian 32, who is presently using a pedestrian crossing. A spatial area 33 around the pedestrian 32 is marked; moreover, their predicted motion 34 is indicated. The area 33 is temporarily blocked to the route planning and cannot be traveled through by motor vehicles.

The invention claimed is:

1. A method for traffic control in a parking environment comprising at least one parking space and used by at least a first group of manually operated traffic participants and a second group of automatically operated traffic participants, the method comprising:
   determining, for each traffic participant of the first and second groups of traffic participants, using a central control device and by considering current status information of the first and second groups of traffic participants as determined by sensors or received from the first and second groups of traffic participants, instruction information describing an operation of each traffic participant in a common route planning in the parking environment,
   wherein priority values are associated to the first and second groups of traffic participants and the determining the instruction information comprises an optimization step such that a traffic participant of a group having a higher priority value is weighted more than a traffic participant of a group having a lower priority value, and
   wherein a priority value for the second group of traffic participants is higher than a priority value for the first group of traffic participants; and
   transmitting the instruction information, via a communication link, to at least a part of the first and second groups of traffic participants, wherein the instruction information is used for outputting information or automatically controlling each traffic participant.

2. The method of claim 1, further comprising:
   in response to a deviation of a traffic participant of one of the first group of traffic participants or the second group of traffic participants from its instruction information, adjusting an instruction information for at least one traffic participant of the other one of the first group of traffic participants or the second group of traffic participants based on a deviation information describing the deviation.

3. The method of claim 1, further comprising:
   in response to a deviation by a manually operated traffic participant from its instruction information, adjusting a trajectory to be travelled or a destination to be reached for at least an automatically operated traffic participant.

4. The method of claim 1, further comprising:
   in response to a deviation by an automatically operated traffic participant from its instruction information, adjusting a trajectory to be travelled or a destination to be reached for at least a manually operated traffic participant.

5. The method of claim 1, further comprising:
   in response to a deviation of a manually operated traffic participant from its instruction information or in response to impossibility of transmitting the instruction information of the manually operated traffic participant to the manually operated traffic participant, adjusting the instruction information of the manually operated traffic participant to block a current spatial operating area of the manually operated traffic participant.

6. The method of claim 1, wherein when a manually operated traffic participant, according to its instruction information, follows an automatically operated traffic participant for at least one trajectory segment, the instruction information of the manually operated traffic participant comprises a follow-up operation.

7. The method of claim 1, wherein an instruction information of a manually operated traffic participant is configured to adapt a steering system of the manually operated traffic participant for outputting a steering torque to a steering handle to output a hint torque, and the hint torque is opposed to a steering process that is in contrast to the instruction information of the manually operated traffic participant.

8. The method of claim 1, further comprising:
   controlling at least one traffic influencing device of the parking environment based on an instruction information of a manually operated traffic participant, wherein the manually operated traffic participant is not configured to receive the instruction information.

9. The method of claim 8, wherein the at least one traffic influencing device comprises a traffic light, a barrier, or an information display device.

10. The method of claim 1, wherein the parking environment is used by a third group of traffic participants comprising pedestrians, for which the instruction information is determined.

11. The method of claim 10, further comprising:
    controlling a traffic influencing device for directing a pedestrian according to an instruction information of the pedestrian, wherein the traffic influencing device comprises a traffic light, a barrier, an information display device, or a locking device for a door.

12. The method of claim 10, further comprising:

transmitting an instruction information of a pedestrian to a mobile device of the pedestrian, wherein the mobile device is configured to create the communication link with the central control device and is configured to output information to the pedestrian.

13. The method of claim 10, further comprising:

in response to a traffic participant of the first group of traffic participants or the second group of traffic participants deviating from its instruction information, adjusting an instruction information of a pedestrian and an instruction information of a traffic participant of the other one of the first group of traffic participants or the second group of traffic participants.

14. The method of claim 10, further comprising:

in response to a traffic participant of the first group of traffic participants or the second group of traffic participants deviating from its instruction information, blocking a spatial area occupied by a pedestrian, which is determined according to a predicted trajectory of the pedestrian, for access by the first and second groups of traffic participants.

15. The method of claim 10, wherein the priority values are associated to the first, second, and third groups of traffic participants.

16. The method of claim 15, wherein the priority value for the second group of traffic participants is higher than a priority value for the third group of traffic participants.

17. The method of claim 15, wherein a priority value of the third group of traffic participants is selected lower than the priority value of the first group of traffic participants and the priority value of the second group of traffic participants.

18. The method of claim 1, wherein the determining the instruction information comprises considering time-dependent information, which describes an expected traffic.

19. The method of claim 18, wherein the time-dependent information comprises statistically determined load information of the parking environment.

20. The method of claim 19, wherein the statistically determined load information comprises information about the at least one parking space, an entrance route, or an exit route.

\* \* \* \* \*